May 17, 1955  W. A. HOFFMAN  2,708,484
POWER DRIVE ATTACHMENT FOR A ROTARY GRASS CUTTER
Filed Oct. 31, 1952  2 Sheets-Sheet 1

Inventor
William A. Hoffman
by Talbert Dick & Adler
Attorneys

Witness
David P. Seeley

May 17, 1955  W. A. HOFFMAN  2,708,484
POWER DRIVE ATTACHMENT FOR A ROTARY GRASS CUTTER
Filed Oct. 31, 1952  2 Sheets-Sheet 2
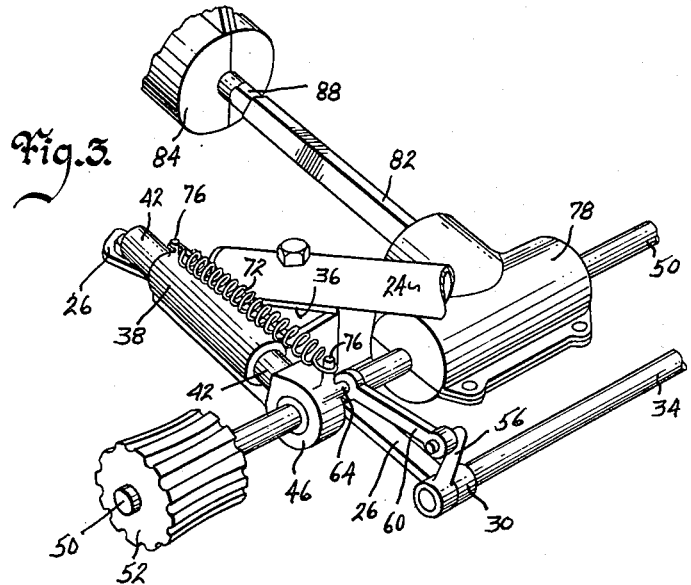
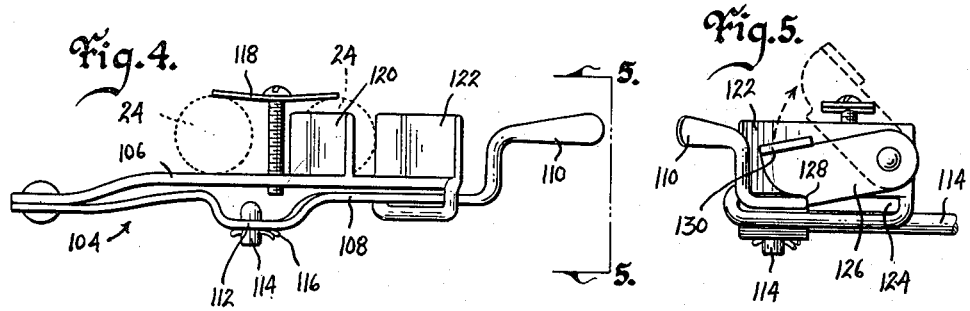
Witness
Edward P. Seeley
Inventor
William A. Hoffman
by Talbert Dick & Adler
Attorneys United States Patent Office 2,708,484
Patented May 17, 1955

2,708,484

POWER DRIVE ATTACHMENT FOR A ROTARY GRASS CUTTER

William A. Hoffman, Shannon City, Iowa

Application October 31, 1952, Serial No. 317,965

8 Claims. (Cl. 180—19)

My invention relates to power lawn mowers and more particularly to a power drive attachment for the rotary cutter type of mower.

The term power lawn mower as applied to the rotary cutter machine usually denotes power operation of the cutting blade as distinguished from self propulsion of the machine over the ground. Since the rotary cutter operates on a direct drive from the engine, no belts, chains, gears or the like are required for that purpose and consequently the movement of the machine over the ground is done by manual pushing with the blade being rotated by power. The reel type mower, on the other hand, has the reel cutter assembly geared to the mower wheels so in this type the power when applied to the wheels by chain or belt drive moves the machine over the ground which in turn operates the reel.

Due to the fact that the rotary type mower must be pushed over the ground, much time and effort has been devoted to providing a wheeled frame that will roll as easy as possible. However, there are situations of sloping and hilly terrain and extremely high grass or weeds when a power drive means for such mowers would considerably alleviate the physical exertion needed and it is to such purpose that my invention is directed.

It is therefore one of the important objects of my invention to provide an attachment for a rotary cutter type power lawn mower that utilizes the engine which operates the blade to make the mower capable of self propulsion over the ground.

A further object of this invention is to provide a device of the above class that requires no structural changes in the mower to which it is applied.

Other objects of this invention are to provide a power drive attachment for rotary type lawn mowers that is light in weight, simple to install, durable in construction and which can be placed into or out of operation at the discretion of the operator.

These and other objects will be apparent to those skilled in the art.

Figure 1:
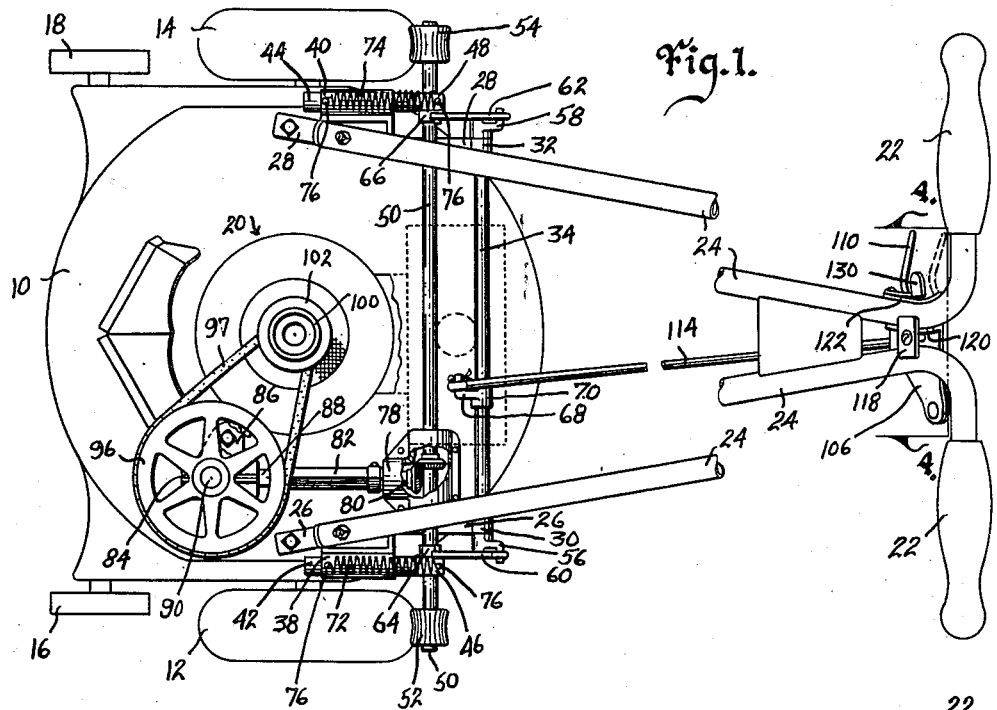
Figure 2:
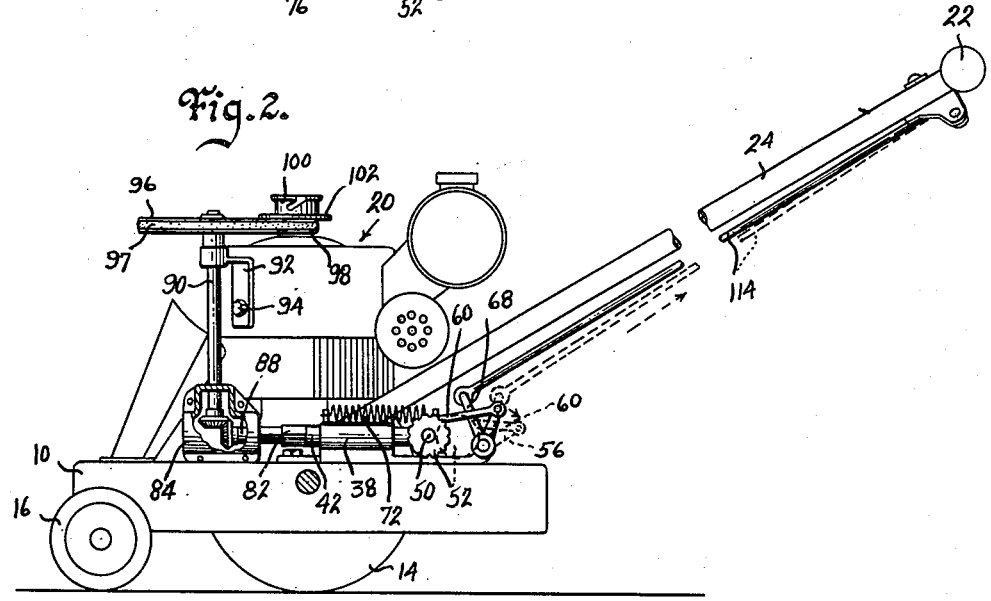

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a top plan view of a rotary type power lawn mower showing a preferred embodiment of my invention mounted thereon, Fig. 2 is a side view of the device shown in Fig. 1, Fig. 3 is an enlarged perspective view of one of the driving spools and showing the relative positions of the two gear boxes used with this invention, Fig. 4 is a rear view of the manually operated control lever taken from the line 4—4 of Fig. 1, and Fig. 5 is a side view of the lever and locking bar taken from the line 5—5 of Fig. 4.

Referring to the drawings, Figs. 1 and 2 show generally in outline the usual structure for a rotary type power lawn mower to which my invention is applied. This consists of a horizontal inverted pan-like frame 10 usually made of pressed steel or the like. This frame is substantially circular in outline and is mounted on two oppositely disposed pneumatic tired wheels 12 and 14, although, of course, non-pneumatic tires may also be used, if desired. A pair of front small guard wheels 16 and 18 may also be arranged on the frame to prevent too close cutting on uneven ground. The power unit, usually an internal combustion engine, shown generally at 20, is disposed on the top of frame 10 so that its drive shaft is perpendicular to the horizontal and extends below the frame. The cutting blade (not shown) is attached directly to the drive shaft below the frame in a well known manner. A pair of handle bars 22 is connected to the respective sides of frame 10 by the tubular or rod members 24. No invention is claimed for any of the structure so far described as it is merely illustrative of the rotary type lawn mower which is manually pushed over the ground with the cutting blade being power operated.

My power drive attachment, except for a detachable control lever and one pulley wheel as will be described, is formed as a single unit so that no assembly thereof is required by the user and all that has to be done is to mount it on the mower. In the construction of my invention I provide two elongated bar base members 26 and 28 that each have formed on their rear end, the respective collar or bearing members 30 and 32 as shown in Fig. 1. A rod 34 is arranged between and rotatably mounted in collars 30 and 32. The spaced relationship between the forward ends of base members 26 and 28 is adapted to correspond to the usual distance between the forward end of handle members 24 at the point where they are attached to frame 10. Each base member 26 and 28 on its forward portion carries an inclined troughlike support for the forward ends of the handle tubes 24 and one such support 36 on base member 26 is shown in Fig. 3. The usual mower structure usually has such supports inclined and positioned to hold the handles 24 at the desired angle and in the proper direction and I have incorporated such supports into my invention so that in mounting this attachment, the standard supports can be removed and will of course be replaced by the like supports on my attachment. My base members 26 and 28 are bolted to the frame in the same place as the original handle supports or rests and thus by having these base members carry attached handle rests, the installation of my attachment is extremely simplified.

On the outer side of the base members 26 and 28 opposite the respective inclined handle rests are the cylindrical housing members 38 and 40 which are rigidly secured to their corresponding base member and rest. The bores of these housings are horizontal and extend longitudinally of the direction of movement of the mower. The respective rods 42 and 44 are slidably arranged in the housings 38 and 40 and on the rear end of each rod 42 and 44 is the respective bearing eyes 46 and 48, the openings in which are transversely of the bores in the housings 38 and 40. An elongated rod 50, parallel to and forward of rod 34 extends between and through the eyes 46 and 48 so as to project outwardly from each eye as illustrated in Fig. 1. Rod or driven shaft 50 is rotatably mounted and carries on its respective ends the ribbed spools 52 and 54 that are rigidly secured so as to rotate with the rod. Each spool 52 and 54 is aligned with the respective wheels 12 and 14 so as to be engageable therewith as will later appear.

On the respective ends of rod 34 outside the collars 30 and 32 of the base members 26 and 28 there is rigidly secured so as to rotate therewith, the upstanding arms 56 and 58, and the respective bar link members 60 and 62 are pivotally secured at their respective ends to the arms 56 and 58 and to inwardly extending projections 64 and 66 on the respective bearing eyes 46 and 48. Intermediate the arms 56 and 58 on rod 34 is another upstanding arm 68 that is rigidly secured thereto by means of a collar 70 and it will thus be apparent that a rearward movement of arm 68 will rotate rod 34 rearwardly and the linkage connection of members 60 and 62 to rod 50 will move this rod rearwardly so that rods 42 and 44 slide within the housings 38 and 40. In this operation, the spools 52 and 54 will move rearwardly accordingly. Conversely, the forward movement of arm 68 will move the related parts in a reverse direction as that just described. For purposes of normally holding the spools in their forwardmost position, I secure a compression spring 72 at one end to eye 46 and at the other end to the forward portion of housing 38 and a similar spring 74 is arranged relative to eye 48 and housing 40. Suitable boss members illustrated generally by the numeral 76 may be formed on the respective eyes and housing for this purpose. These springs are designed to normally hold rods 42 and 44 in their forward position and the spools, rod 50 and arm 68 will be normally positioned accordingly.

To one side of the center of rod 50 there is disposed thereon a gear box 78 with a bevel gear connection to rod 50 as shown in Fig. 1. From box 78 a square stub shaft 80 extends forwardly perpendicular to rod 50 and mounted on shaft 80 is the elongated socket or sheath 82 that is square in cross-section. Forwardly of box 78 is a second gear box 84 containing a horizontal plate 86 by which it is suitably mounted on the frame 10 with one of the frame bolts. A second square stub shaft 88 extends rearwardly from box 84 and is aligned with sheath 82 which is telescopically slidable thereon. Shaft 88 connects by bevel gear arrangement (Fig. 2) to a vertical shaft 90 that extends upwardly from box 84 where it is suitably supported against the engine housing by the bracket 92 and for this purpose one of the engine housing bolts 94 can be utilized. A pulley wheel 96 mounted to the top of shaft 90 carries an endless belt 97 that connects to a pulley 98 mounted below the rope pulley 100 on the engine 20. The rope pulley 100 is, of course, standard equipment and I find there is ample space on the pulley shaft to mount my belt pulley 98 as described. Preferably, however, I suggest a rigid connection between rope pulley 100 and belt pulley 98 and if this is done, a dividing flange 102 can be formed between the two as a matter of avoiding accidental slippage of the starting rope to pulley 98 when the rope is being applied to pulley 100.

By the structure described it will be apparent that when the engine 20 is operating, the belt 97 will move in a clockwise direction as viewed in Fig. 1 and the related bevel gear arrangements will cause the spools 52 and 54 to rotate rearwardly. Consequently, when they contact the perimeter of wheels 12 and 14 at the rear, these wheels are rotated forwardly by this frictional engagement. Due to springs 72 and 74, the spools 52 and 54 will normally be in driving contact with the wheels 12 and 14 but to disengage this contact I provide a manually operated lever which I shall now describe.

The lever assembly shown generally at 104 in Fig. 4 consists of a bar 106 to one end of which is pivotally secured a lever 108 having its free end bent to form the handle portion 110. A U-bend 112 in the handle is provided with a hole into which is hooked one end of an operating rod 114 that is pivotally connected at its other end with arm 68 on rod 34. A cotter pin 116 or the like may be used to keep rod 114 from being accidentally disengaged from bend 112. Bar 106 is secured in any suitable manner to the mower handle near the hand grip portion and preferably I secure it to the underside of the handle bars by the screw clamp 118 which bears against the top of members 24 in a well known manner. Since many handle members on mowers of the type involved are tubular or rod shaped, I have adapted my lever control thereto and therefore on one end of bar 106 I have provided the spaced vertical guides 120 and 122 that are curved to conform to the curvature of one of the members 24 near the handle bar 22 and this merely adds strength and aids in positioning the lever assembly at a convenient place. On the outer side of guide 122 is a slot 124 through which the lever 108 passes and in which it is movable. A latch member 126 is vertically pivotally secured at one end to the outer side of guide 124 and contains a notched portion 128 that is engageable with the forward side of lever 108 (Fig. 5) to hold this lever in its rearmost position. A finger grip lip 130 is provided on latch 126 to facilitate the grasping thereof.

As pointed out above, this attachment except for the lever and operating rod, are formed as a complete unit and to mount it the usual supports or rests for the forward end of the handle rods are removed and my base members 26 and 28 mounted in the same place. Brace 92 is secured to the motor housing and pulley 98 is then arranged below the rope pulley and in this respect, if my preferred arrangement of joining pulleys 98 and 100 is adapted, the slight changes described will of course have to be made. With the belt 97 and lever assembly 104 in place, the mower can be self propelled. Spools 52 and 54 are designed to be normally in engagement with the wheels 12 and 14, but a rearward pull on handle 110 will move rod 50 rearwardly so that the spools will rotate free of contact with the wheels. Latch 126 when down will of course hold rod 108 to the rear so that arm 68 on rod 34 is likewise to the rear. To place the spools in engagement with the wheels, it is only necessary to raise latch 126 whereby springs 72 and 74 will automatically return bar 50 to its forward position. In the respective rear and forward movements of the rods 50, 34, 42, 44, the spools and other related parts as described, it will be understood that the sheath 82 slides on the shaft 88 so that there is no loss of driving contact from the engine 20 to the spools 52 and 54.

As pointed out above, my particular structure of base members 26 and 28 together with the rests 36 is used as a matter of expediency and convenience and is not essential to this invention. The rests 36 merely replace like equipment on the mower to simplify installation and it will be understood that housings 38 and 40 without the rests 36 and with or without base members 26 and 28 could be suitably attached to the frame 10 to accomplish the objects of this invention.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my power drive attachment for a rotary grass cutter without departing from the real spirit and purpose of my invention, and it is my intention to cover by my claims, any modified form of structure or use of mechanical equivalents which may be reasonably included within their scope.

I claim:

1. A power drive attachment for a rotary type power lawn mower of the class having at least a frame, a wheel at each side of the frame for movement over the ground, a motor disposed on said frame, a vertical drive shaft connected to said motor and a handle bar attached to said frame, said attachment comprising, a pair of bar base members oppositely disposed on said frame adjacent the respective wheels, one end of each base member projecting rearwardly from said frame, a collar on the projected end of each base member, a first rod rotatably journalled at its respective ends in said collars, a cylindrical housing rigidly secured to each base member having bores therein disposed in line with the direction of movement of said mower, a second and third rod respectively slidable in the respective bores, a bearing eye on the rear end of each second and third rod, a driven shaft parallel to the first and rotatably journalled in said eyes so that the respective shaft ends protrude from each eye, a spool member on the respective ends of the driven shaft, each spool engageable with the perimeter of one of the wheels, an arm on each end of the first rod, a link connecting each respective arm to one of said eyes whereby rotation of the first rod forwardly or rearwardly moves the second rod, third rod and driven shaft correspondingly, a spring connecting each respective eye to its corresponding housing to normally hold said second rod, third rod and driven shaft in their forwardmost position, means for rotating said first rod, means for locking said first rod against rotation, a gear box disposed on said driven shaft containing a bevel gear arrangement therewith to a first shaft extending forwardly therefrom, a second gear box forwardly of the first and mounted on said frame, a second shaft extending rearwardly therefrom, a socket member secured to said first shaft and slidably arranged on the second, a vertical shaft disposed in said second gear box and connected by bevel gears to the second shaft, a pulley wheel on said vertical shaft, a pulley on the drive shaft, and an endless belt connecting said pulley wheels.

2. A power drive attachment for a rotary type power lawn mower of the class having at least a frame, a wheel at each side of the frame for movement over the ground, a motor disposed on said frame, a vertical drive shaft connected to said motor and a handle bar attached to said frame, said attachment comprising, a pair of bar base members oppositely disposed on said frame adjacent the respective wheels, a cylindrical housing rigidly secured to each base having bores therein disposed in line with the direction of movement of said mower, a first and second rod respectively slidable in the respective bores, a bearing eye on the rear end of each first and second rod, a driven shaft rotatably journalled in said eyes so that the respective shaft ends protrude from each eye, a spool member on the respective ends of the driven shaft, each spool engageable with the perimeter of one of the wheels, a spring connecting each respective eye to its corresponding housing to normally hold said first rod, second rod and driven shaft in their forwardmost positions, means for moving said driven shaft rearwardly at times, a gear box disposed on said driven shaft containing a bevel gear arrangement therewith, a first shaft connected to said bevel gear arrangement and extending forwardly from said gear box perpendicular to said driven shaft, a second gear box forwardly of the first and mounted on said frame, a second shaft extending rearwardly therefrom in line with the first shaft, a socket member secured to said first shaft and slidably arranged on the second, a vertical shaft disposed in said second gear box and connected by bevel gears to the second shaft and connected to said drive shaft.

3. A power drive attachment for a rotary type power lawn mower of the class having at least a frame, a wheel at each side of the frame for movement over the ground, a motor disposed on said frame, a vertical drive shaft connected to said motor and a handle bar attached to said frame, said attachment comprising, a pair of cylindrical housing members oppositely disposed on said frame adjacent the respective wheels having bores therein disposed in line with the direction of movement of said mower, a first and second rod respectively slidable in the respective bores, a bearing eye on the rear end of each first and second rod, a driven shaft rotatably journalled in said eyes so that the respective shaft ends protrude from each eye, a spool member on the respective ends of the driven shaft, each spool engageable with the perimter of one of the wheels when said driven shaft is in its forward position, yielding means connecting each respective eye to its corresponding housing to normally hold said first rod, second rod and driven shaft in their forwardmost positions, means for moving said driven shaft rearwardly at times, a gear box disposed on said driven shaft containing a bevel gear arrangement therewith, a first shaft connected to said bevel gear arrangement and extending forwardly from said gear box perpendicular to said driven shaft, a second gear box forwardly of the first and mounted on said frame, a second shaft extending rearwardly therefrom in line with the first shaft, a socket member secured to said first shaft and slidably arranged on the second, a vertical shaft disposed in said second gear box and connected by bevel gears to the second shaft and connected to said drive shaft.

4. A power drive attachment for a rotary type power lawn mower of the class having at least a frame, a wheel at each side of the frame for movement over the ground, a motor disposed on said frame, a vertical drive shaft connected to said motor and a handle bar attached to said frame, said attachment comprising, a pair of bar base members oppositely disposed on said frame adjacent the respective wheels, a cylindrical housing rigidly secured to each base having bores therein disposed in line with the direction of movement of said mower, a first and second rod respectively slidable in the respective bores, a bearing eye on the rear end of each first and second rod, a driven shaft rotatably journalled in said eyes so that the respective shaft ends protrude from each eye, a spool member on the respective ends of the driven shaft, each spool engageable with the perimeter of one of the wheels, a spring connecting each respective eye to its corresponding housing to normally hold said first rod, second rod and driven shaft in their forwardmost positions, means for moving said driven shaft rearwardly at times, a vertical shaft suitably rotatably disposed on said frame, a pulley wheel on said vertical shaft, a pulley wheel on said motor drive shaft, an endless belt connecting said pulley wheels, and means for operatively connecting said vertical shaft to said driven shaft and to said drive shaft whereby said driven shaft and spools are rotated when the motor is running.

5. A power drive attachment for a rotary type power lawn mower of the class having at least a frame, a wheel at each side of the frame for movement over the ground, a motor disposed on said frame, a vertical drive shaft connected to said motor and a handle bar attached to said frame, said attachment comprising, a pair of cylindrical housing members oppositely disposed on said frame adjacent the respective wheels having bores therein disposed in line with the direction of movement of said mower, a first and second rod respectively slidable in the respective bores, a bearing eye on the rear end of each first and second rod, a driven shaft rotatably journalled in said eyes so that the respective shaft ends protrude from each eye, a spool member on the respective ends of the driven shaft, each spool engageable with the perimeter of one of the wheels when said driven shaft is in its forward position, a spring connecting each respective eye to its corresponding housing to normally hold said first, second and driven shaft in their forwardmost positions, means for moving said driven shaft rearwardly at times, a vertical shaft suitably rotatably disposed on said frame, a pulley wheel on said vertical shaft, a pulley wheel on said motor drive shaft, an endless belt connecting said pulley wheels, and means for operatively connecting said vertical shaft to said driven shaft and to said drive shaft whereby said driven shaft and spools are rotated when the motor is running.

6. A power drive attachment for a rotary type power lawn mower of the class having at least a frame, a wheel at each side of the frame for movement over the ground, a motor disposed on said frame, a vertical drive shaft connected to said motor and a handle bar attached to said frame, said attachment comprising, a pair of bar base members oppositely disposed on said frame adjacent the respective wheels, a cylindrical housing rigidly secured to each base having bores therein disposed in line with the direction of movement of said mower, a first and second rod respectively slidable in the respective bores, a bearing eye on the rear end of each first and second rod, a driven shaft rotatably journalled in said eyes so that the respective shaft ends protrude from each eye, a spool member on the respective ends of the driven shaft, each spool engageable with the perimeter of one of the wheels, a spring connecting each respective eye to its corresponding housing to normally hold said first rod, second rod and driven shaft in their forwardmost positions, means for securing a third rod to the rear portion of said frame and parallel to said driven shaft, means for moving said driven shaft rearwardly at times, comprising, an arm rigidly secured to said third rod, a lever movably arranged on said handle bar, a control rod attached at its respective ends to said arm and said lever, a gear box disposed on said driven shaft containing a bevel gear arrangement therewith, a first shaft connected to said bevel gear arrangement and extending forwardly from said gear box perpendicular to said driven shaft, a second gear box forwardly of the first and mounted on said frame, a second shaft extending rearwardly therefrom in line with the first shaft, a socket member secured to said first shaft and slidably arranged on the second, a vertical shaft disposed in said second gear box and connected by bevel gears to the second shaft and to said drive shaft.

7. A power drive attachment for a rotary type power lawn mower of the class having at least a frame, a wheel at each side of the frame for movement over the ground, a motor disposed on said frame, a vertical drive shaft connected to said motor and a handle bar attached to said frame, said attachment comprising, a pair of cylindrical housing members oppositely disposed on said frame adjacent the respective wheels having bores therein disposed in line with the direction of movement of said mower, a first and second rod respectively slidable in the respective bores, a bearing eye on the rear end of each first and second rod, a driven shaft rotatably journalled in said eyes so that the respective shaft ends protrude from each eye, a spool member on the respective ends of the driven shaft, each spool engageable with the perimeter of one of the wheels when said driven shaft is in its forward position, a spring connecting each respective eye to its corresponding housing to normally hold said first rod, second rod and driven shaft in their forwardmost positions, means for securing a third rod to the rear portion of said frame and parallel to said driven shaft, means for moving said driven shaft rearwardly at times, comprising, an arm rigidly secured to said third rod, a lever movably arranged on said handle bar, a control rod attached at its respective ends to said arm and said lever, a vertical shaft suitably rotatably disposed on said frame, a pulley wheel on said vertical shaft, a pulley wheel on said motor drive shaft, an endless belt connecting said pulley wheels, and means for operatively connecting said vertical shaft to said driven shaft and to said drive shaft whereby said driven shaft and spools are rotated when the motor is running.

8. A power drive attachment for a rotary type power lawn mower of the class having at least a frame, a wheel at each side of the frame for movement over the ground, a motor disposed on said frame, a vertical drive shaft connected to said motor and a handle bar attached to said frame, said attachment comprising, a pair of bar base members oppositely disposed on said frame adjacent the respective wheels, one end of each base member projecting rearwardly from said frame, a collar on the projected end of each base member, a first rod rotatably journalled at its respective ends in said collars, a cylindrical housing rigidly secured to each base member having the bores therein disposed in line with the direction of movement of said mower, a second and third rod respectively slidable in the respective bores, a bearing eye on the rear end of each second and third rod, a driven shaft parallel to the first and rotatably journalled in said eyes so that the respective shaft ends protrude from each eye, a spool member on the respective ends of the driven shaft, each spool engageable with the perimeter of one of the wheels, an arm on each end of the first rod, a link connecting each respective arm to one of said eyes whereby rotation of the first rod forwardly or rearwardly moves the second rod, third rod and driven shaft correspondingly, a spring connecting each respective eye to its corresponding housing to normally hold said second rod, third rod and driven shaft in their forwardmost position, means for permitting the manual rotation of said first rod to engage or disengage said spools with the perimeters of said wheels, comprising, a third arm on said first rod, a hand lever movably mounted on the handle bar, an operating rod connecting said third arm and said hand lever, and a latch member to limit the movement of said hand lever, a gear box disposed on said driven shaft containing a bevel gear arrangement therewith to a first shaft extending forwardly therefrom, a second gear box forwardly of the first and mounted on said frame, a second shaft extending rearwardly therefrom, a socket member secured to said first shaft and slidably arranged on the second, a vertical shaft disposed in said second gear box and connected by bevel gears to the second shaft, a pulley wheel on said vertical shaft, a pulley on the drive shaft, and an endless belt connecting said pulley wheels.

References Cited in the file of this patent

UNITED STATES PATENTS

| | | |
|---|---|---|
| 2,335,541 | Ronning | Nov. 30, 1943 |
| 2,519,749 | Edwards | Aug. 22, 1950 |
| 2,522,112 | Gilmour | Sept. 12, 1950 |
| 2,523,439 | May | Sept. 26, 1950 |